United States Patent [19]

Sparks

[11] B 3,992,349

[45] Nov. 16, 1976

[54] PHOTODEGRADABLE POLYOLEFIN COMPOSITION CONTAINING A MIXTURE OF AN ARYL KETONE AND AN ALKANOLAMINE

[75] Inventor: Allen K. Sparks, Basking Ridge, N.J.

[73] Assignee: UOP Inc., Des Plaines, Ill.

[22] Filed: July 17, 1975

[21] Appl. No.: 596,692

[44] Published under the second Trial Voluntary Protest Program on February 17, 1976 as document No. B 596,692.

Related U.S. Application Data

[63] Continuation-in-part of Ser. No. 428,561, Dec. 26, 1973, abandoned.

[52] U.S. Cl. .................. 260/32.6 R; 260/32.8 A; 260/DIG. 43
[51] Int. Cl.² .................................. C08K 5/17
[58] Field of Search ............... 260/DIG. 43, 32.6 R, 260/32.8 A, 45.9 R, 45.7 R, 45.95 L, 45.95 F; 204/159.23

[56] References Cited
UNITED STATES PATENTS

| | | | |
|---|---|---|---|
| 3,371,048 | 2/1968 | Cyba | 260/45.95 |
| 3,625,744 | 12/1971 | Juna et al. | 204/159.23 |
| 3,661,614 | 5/1972 | Bassemir et al. | 204/159.23 |
| 3,759,807 | 9/1973 | Osborn et al. | 204/159.23 |
| 3,797,690 | 3/1974 | Taylor et al. | 260/23 H |
| 3,825,627 | 7/1974 | McGaugh | 260/DIG. 43 |
| 3,830,764 | 8/1974 | Hudgin et al. | 260/DIG. 43 |

FOREIGN PATENTS OR APPLICATIONS 1,304,112   1/1973   United Kingdom ............ 204/159.23

OTHER PUBLICATIONS

Polymer Preprints, vol. 13, No. 2, July 15, 1972, p. 627, Scott.

*Primary Examiner*—Eugene C. Rzucidlo
*Attorney, Agent, or Firm*—James R. Hoatson, Jr.; Raymond H. Nelson; William H. Page, II

[57] ABSTRACT

A novel composition of matter is set forth which comprises an arylketone, an alkanol amine, prepared from the reaction of an aliphatic amine or polyamine with one or more equivalents of an olefinic epoxide, and an olefinic polymer.

6 Claims, No Drawings

PHOTODEGRADABLE POLYOLEFIN COMPOSITION CONTAINING A MIXTURE OF AN ARYL KETONE AND AN ALKANOLAMINE

CLOSELY RELATED APPLICATIONS

This is a continuation-in-part of my previously filed application Ser. No. 428,561 filed Dec. 26, 1973, now abandoned all the teachings of which are incorporated herein.

This invention relates to a novel composition of matter. More specifically, this invention relates to a novel composition of matter which comprises from about .01 to about 10.00 weight percent of an arylketone possessing the structure:

in which $R_1$ is selected from a group consisting of an alkyl, aryl, alkaryl, aralkyl, cycloalkyl, substituted alkyl, substituted aryl, substituted alkaryl, substituted aralkyl or substituted cycloalkyl radical and $R_2$ is selected from a group consisting of an alkyl, aryl, alkaryl, aralkyl, cycloalkyl, alkoxy, halogen, carboxy, carboalkoxy, substituted alkyl, substituted aryl, substituted alkaryl, substituted aralkyl, substituted cycloalkyl, substituted alkoxy, substituted carboxy and substituted carboalkoxy radical and in which $n$ is equal to an integer between 0 and 5; .01 to about 10.00 weight percent of an alkanol amine prepared from the reaction of an aliphatic amine or polyamine with one or more equivalents of an olefinic epoxide; and about 80.00 to about 99.98 weight percent of an olefinic polymer selected from the group consisting of polypropylene, polyethylene or polybutene.

In the prior art it is known that plastics will retain their natural physical properties under normal use conditions. It is also known that the incorporation of a light sensitizer in a hydrocarbon polymer will increase the susceptibility of the plastic to degradation by light. However, the sensitization of the hydrocarbon polymer affords a plastic which will begin to lose its strength when exposure to light begins. The prior art has also shown that the life of the sensitized polymer may be extended by incorporation of a light absorber such as o-hydroxybenzophenone, 2-(o-hydroxyphenyl)benzotriazole, 2,2'- 4,4'-tetrahydroxybenzophenone or 2,2'-dihydroxy-4,4'-dimethoxybenzophenone, but even in this system the polymer begins losing its strength as soon as it is exposed to light.

In contradistinction to the prior art it has now been discovered that the utilization of the novel composition of matter comprising an aryl ketone, an alkanol amine and an olefinic polymer will permit the plastic to retain its physical properties to a much greater extent during exposure to light until shortly before the period of degradability begins. The utilization of the above composition of matter will enable the manufacturer of plastic materials to produce a plastic which will retain its physical properties over a longer period of time and therefore render a more useful product. The disposal of plastic materials has created an environment problem which may be mitigated by the adoption of the use of the novel composition of matter hereinafter set forth.

The desired products of this invention, namely, the novel polyolefin polymer compositions of matter, are useful as additives to plastics, polymers, copolymers, tetrapolymers, resins, etc. Various plastics which may be utilized would include thermoplastics, laminated plastics, reinforced plastics, cellulose acetate derivatives, urea-formaldehyde resins and plastics, vinyl resins and plastics, styrene resins and plastics, cellulose acetate butyrate derivatives, ethyl cellulose derivatives, polyamides, melamine-formaldehyde (amino resins and plastics), polyesters, silicones, polyolefinic compounds and expoxy compounds.

It is therefore an object of this invention to provide novel compositions of matter which will allow plastics to retain their physical properties to a much greater extent during exposure to light when addition is made to said plastic.

In one aspect an embodiment of this invention resides in a novel composition of matter which comprises from about .01 to about 10.00 weight percent of an arylketone possessing the structure:

in which $R_1$ is selected from a group consisting of an alkyl, aryl, alkaryl, aralkyl, cycloalkyl, substituted alkyl, substituted aryl, substituted alkaryl, substituted aralkyl or substituted cycloalkyl radical and $R_2$ is selected from a group consisting of an alkyl, aryl, alkaryl, aralkyl, cycloalkyl, alkoxy, halogen, carboxy, carboalkoxy, substituted alkyl, substituted aryl, substituted alkaryl, substituted aralkyl, substituted cycloalkyl, substituted alkoxy, substituted carboxy and substituted carboalkoxy radical and in which n is equal to an integer between 0 and 5; .01 to about 10.00 weight percent of an alkanol amine prepared from the reaction of an aliphatic amine or polyamine with one or more equivalents of an olefinic epoxide; and about 80.00 to about 99.98 weight percent of an olefinic polymer selected from the group consisting of polypropylene, polyethylene or polybutene.

A specific embodiment of this invention resides in a composition of matter comprising 0.5 weight percent N,N'-dioctyl N,N'-di-2-hydroxyethyl ethylenediamine, 1.0 weight benzophenone and 98.5 weight percent polypropylene.

Another specific embodiment of the present invention resides in a composition of matter which comprises 0.5 weight percent N,N'-di-sec-octylaminoethanol, 1.0 weight percent benzophenone and 98.5 weight percent polypropylene.

Yet another specific embodiment of the present invention resides in a composition of matter comprising 6.90 weight percent 3-isopropylphenyl 3-phenylpropyl ketone, 5.00 weight percent of (2-hydroxyamyl) n-amyl 3-propoxyphenylamine and 88.10 weight percent of poly-(butene-1).

Other objects and embodiments will be found in the following further description of the present invention.

As hereinbefore set forth, the present invention is concerned with a novel composition of matter which may be utilized to control light degradation of plastic compositions of matter comprising a ketone, an alkanol amine and an olefinic polymer.

The novel composition of matter of the present invention comprises an arylketone in accordance with the following structure:

$$[R_2]_{5-n} C_6H_nC-R_1$$

in which $R_1$ is selected from a group consisting of an alkyl, aryl, alkaryl, aralkyl, cycloalkyl, substituted alkyl, substituted aryl, substituted alkaryl, substituted aralkyl or substituted cycloalkyl radical and $R_2$ is selected from a group consisting of an alkyl, aryl, alkaryl, aralkyl, cycloalkyl, alkoxy, halogen, carboxy, carboalkoxy, substituted alkyl, substituted aryl, substituted alkaryl, substituted aralkyl, substituted cycloalkyl, substituted alkoxy, substituted carboxy and substituted carboalkoxy radical and in which n is equal to an integer between 0 and 5. The aryl ketones may be exemplified by methyl phenyl ketone, ethyl phenyl ketone, propyl phenyl ketone, amyl phenyl ketone, hexyl phenyl ketone, heptyl phenyl ketone, octyl phenyl ketone, decyl phenyl ketone, tetradecyl phenyl ketone, diphenyl ketone, 2-methylphenyl phenyl ketone, 3-ethylphenyl phenyl ketone, 4-propylphenyl phenyl ketone, 3-amylphenyl phenyl ketone, 2,3-di-n-butylphenyl phenyl ketone, 2,3,4-triamylphenyl phenyl ketone, 3-phenylbutyl phenyl ketone, 4,6-diphenylhexyl phenyl ketone, cyclobutyl phenyl ketone, cyclopentyl phenyl ketone, cyclohexyl phenyl ketone, 3-methoxyamyl phenyl ketone, 2-ethoxyhexyl phenyl ketone, 3-methoxyphenyl phenyl ketone, 2-ethoxyphenyl phenyl ketone, 3-propoxyphenyl phenyl ketone, 2,3-dimethoxyphenyl phenyl ketone, 2,3,4-triethoxyphenyl phenyl ketone, 2-methoxycyclopentyl phenyl ketone, 3-ethoxycyclohexyl phenyl ketone, 2-chlorocyclopentyl phenyl ketone, 2,3-dichlorocyclohexyl phenyl ketone, 2-chlorobutyl phenyl ketone, 2,3-dichlorobutyl phenyl ketone, 3-chlorophenyl phenyl ketone, 2,3-dichlorophenyl phenyl ketone, 2-carboxyphenyl phenyl ketone, 3-methoxyphenyl methyl ketone, 4-propoxyphenyl cyclopentyl ketone, etc.

The novel composition of matter of the present invention also contains an alkanol amine. The alkanol amines which may be utilized in the present invention may be any alkanol amine including an alkanol diamine which may be prepared from the reaction of aliphatic amine or a polyamine with one or more equivalents of an olefinic epoxide. Suitable examples of alkanol amines would include, for example, N,N'-dibutyl N,N'-di(2-hydroxyethyl)ethylenediamine, (di-2-hydroxyethyl)-n-amyl amine, 2-hydroxyamyl n-amyl 3-propylphenyl amine, 2-hydroxyamyl n-butyl amyl amine, 2-hydroxyhexyl dinonanyl amine, 2-hydroxybutyl methyl phenyl amine, 2-hydroxypropyl methyl 2-methylphenyl amine, 2-hydroxyheptyl ethyl 2,3-dimethoxyphenyl amine, 2-hydroxyethyl-dicyclohexyl amine, 2-hydroxyoctyl di-2-ethylphenyl amine, 2-(dicyclohexylamino)-propanol, N,N-di-2-hydroxyethoxy poly(2-ethoxyethyl) amyl amine, sec-butyl amyl amine, di-sec-hexyl amine, di-sec-octyl amine, sec-butyl 2-hydroxypropyl amine, 2-(dicyclo-sec-hexylamineo)propanol, N,N'-di-sec-octylaminoethanol, N,N'-di-sec-octyl N,N'-di-(2-hydroxyethyl)ethylenediamine, N,N'-di-sec-hexyl N,N'-di-(3-hydroxyheptyl) ethylenediamine, etc.

The novel composition of matter of the present invention comprises an olefinic polymer selected from the group consisting of polypropylene, polyethylene and polybutene. Suitable examples of the olefinic polymer material will include polypropylene, polyethylene, poly-(butene-1) or poly(butene-2).

It is understood that the aforementioned aryl ketones, alkanol amines and the olefinic polymers are only representative of the class of compounds which, may be employed and the process of the present invention is not necessarily limited thereto.

Another parameter which is contemplated within the scope of the present invention is the percentage weight composition of the materials comprising the novel composition of matter. The aryl ketone comprises from about 0.01 weight percent to about 10.00 weight percent, the alkanol amine comprises from about 0.01 weight percent to about 10.00 weight percent and the olefinic polymer comprises from about 80.00 weight percent to about 99.98 weight percent of the total weight of the polyolefinic polymer.

The novel polyolefinic polymer composition of matter may be prepared by any methods known to the art such as admixture, grinding, stirring, plating, slurry preparations, etc. The novel polyolefin polymer composition of matter may be admixed with plastics, resins, polymers, copolymers, tetrapolymers, etc., in a range of from about 5 percent to about 50 percent by weight of the total polymeric or plastic compound to be treated. The admixing of the two compounds may be effected in any manner known in the art as previously mentioned. For example, the polyolefinic polymer comprising diphenyl ketone, N,N'-dioctyl N,N'-di-(2-hydroxyethyl)ethylenediamine and polypropylene may be physically mixed in any manner known to the art such as by milling, by dissolving the compounds in a mutually miscible solvent compound, etc., the only criterion which must be met in forming the final composition of matter is that the two compounds are thoroughly mixed so as to impart a uniform degree of the desired physical characteristics to the polymer so treated.

Illustrative examples of novel polyolefinic polymer compositions of matter of the present invention comprise an aryl ketone, an alkanol amine, and an olefinic polymer will include diphenyl ketone, N,N'-dibutyl N,N'-di-(2-hydroxyethyl) ethylenediamine, polypropylene; diphenyl ketone, N,N'-dibutyl N,N'-di-(2-hydroxyethyl) ethylenediamine, polyethylene; diphenyl ketone, N,N'-dibutyl N,N'-di-(2-hydroxyethyl)ethylenediamine, poly-(butene-1); diphenyl ketone, N,N'-dibutyl N,N'-di-(2-hydroxyethyl)ethylenediamine, poly-(butene-1); diphenyl ketone, n-amyl di-2-hydroxyethyl amine, poly-(butene-1); diphenyl ketone, n-amyl di-2-hydroxyethyl amine, poly-(butene-2); diphenyl ketone, 2-hydroxyamyl n-amyl 3-propoxyphenyl amine, polyethylene; diphenyl ketone, 2-chlorophenyl methyl ketone, N,N'-dibutyl N,N'-di-(2-hydroxyethyl) ethylenediamine, polypropylene; 2-chlorophenyl methyl ketone, n-amyl di-2-hydroxyethyl amine, poly-(butene-1); 2-chlorophenyl methyl ketone, 2-hydroxyamyl n-amyl 3-propoxyphenyl amine, poly-(butene-1); 4-methoxy-3-methylphenyl 3-methylphenyl ketone, N,N'-dibutyl N,N'-di-(2-hydroxyethyl)ethylenediamine, polypropylene; 4-methoxy-3-methylphenyl 3-methylphenyl ketone, n-amyl di-2-hydroxyethyl amine, poly-(butene-1); 4-methoxy-3-methylphenyl 3-methylphenyl ketone, 2-hydroxyamyl n-amyl 3-propoxyphenyl amine, poly-(butene-1); 3-isopropylphenyl 3-phenylpropyl ketone, N,N'-dibutyl N,N'-di-(2-hydroxyethyl) ethylenediamine, polypropylene; 3-isopropylphenyl 3-phenylpropyl ketone, n-amyl di-2-hydroxyethyl amine, poly-(butene-1); 3-isopropylphenyl 3-phenylpropyl ketone, 2-hydroxyamyl n-amyl 3- propoxyphenyl amine, poly-(butene-1); 3-cyclopentyl-phenyl cyclohexyl ketone, N,N'-dibutyl N,N'-di-(2-hydroxyethyl) ethylenediamine, polypropylene; 3-cyclopentylphenyl cyclohexyl ketone, n-amyl di-2-hydroxyethyl amine, poly-(butene-1); 3-cyclopentylphenyl cyclophexyl ketone, 2-hydroxyamyl n-amyl 3-propoxyphenyl amine, poly-(butene-1); 2-carboxyphenyl methyl ketone, n-amyl di-2- hydroxyethyl amine, poly-(butene- 1); 2-carboxyphenyl methyl ketone, 2-hydroxyamyl n-amyl 3-propoxyphenyl amine, poly-(butene-1); etc.

It is understood that the aforementioned novel polyolefinic polymer compositions of matter are only representative of the class of compositions of matter which may be prepared and that the present invention is not necessarily limited thereto.

The following examples are given to illustrate the novel compounds and the novel retention of physical properties during exposure to light of the compositions of matter of the present invention. However, these examples are not intended to limit the generally broad scope of the present invention in strict accordance therewith.

EXAMPLE 1

In this example, a commercial grade of polypropylene (Hercules Profax 6501) was stabilized against thermal degradation thorugh the incorporation of 0.1 weight percent of a 1,3,5-thrimethyl-2,4,6-tris-(3,5-di-tert-butyl-4-hydroxybenzyl) benzene (also known as Ethyl 330) and 0.2 weight percent of distearylthiodipropionate (also known as DSTDP), hereinafter to be referred to as thermally stabilized polypropylene. A sample of the thermally stabilized polypropylene was pressed to a thickness of 5-15 ml thick, cut into strips and exposed to ultra-violet light. The ultra-violet light used was obtained from a Carbon-arcing water-cooled fadeometer used for accelerated aging tests which was kept at 30°-35°C. Samples were withdrawn during the total testing period of 92 hours at intervals of 23, 46 and 69 hours. The remaining tensile strength of the polymer after exposure to the light source was found to be 100 percent at the 23rd, 46th and 69th hours and 50 percent at the 92nd hour. This retention of strength demonstrates that plastics such as polypropylene will retain their strength under normal use conditions.

EXAMPLE II

In this example 1.0 gram of diphenyl ketone (also known as benzophenone) was added to 99 grams of thermally stabilized polypropylene as hereinbefore set forth in Example I above. The polypropylene containing the diphenyl ketone was exposed to the accelerated ultra-violet aging fadeometer equipment and irradiated at 35°C. Samples were withdrawn during the testing time period of 24 hours at intervals of 6 hours, 12 hours and 18 hours respectively. The retention of tensile strength during the above time periods was found to be 95 percent at the 6th hour, 87 percent at the 12th hour, 73 percent at the 18th hour and 50 percent at the 24th hour. The results of this example compared to Example I demonstrate that the polypropylene physical strength is greatly reduced by the addition of a light sensitizer such as diphenyl ketone.

EXAMPLE III

In this example a 0.5 gram sample of N,N'-dioctyl N,N'-di-2-hydroxyethyl ethylenediamine was added to 98.5 grams of polypropylene which contained 1.0 gram of benzophenone as hereinbefore set forth in Examples I and II above. The polypropylene containing the benzophenone and the substituted ethylenediamine was exposed to the accelerated ultra-violet aging fadeometer equipment and irradiated at 35°C. Samples were withdrawn during the testing time period of 72 hours at intervals of 18 hours, 36 hours and 54 hours respectively. The retention of tensile strength during the time periods was found to be 100 percent at the 18th hour, 98 percent at the 36th hour, 90 percent at the 54th hour and 50% at the 72nd hour. The results of this analysis in comparison with the results of Examples I and II demonstrate that the polypropylene plastic containing both the alkanol amine and the light sensitizer such as benzophenone will retain the majority of its physical properties for a longer period of time before rapid degradation of the polymer begins. Even though the stabilized polypropylene retained its physical properties as well as the stabilized polypropylene containing the alkanol amine benzophenone it is much easier to prepare a controlled lifetime for the latter polymer than the former.

EXAMPLE IV

In this example a polyolefinic polymer comprising 1.2 grams of 4-methoxy-3-methylphenyl 3-methylphenyl ketone, 0.5 grams of n-amyl di-2-hydroxyethyl amine and 23.3 grams of stabilized poly-(butene-1) are added to 75.0 grams of a plastic comprising stabilized poly-(butene-1). The solution is exposed to the accelerated ultra-violet aging fadeometer equipment and irradiated at 35°C. Samples are withdrawn at intervals of one-fourth, one-half and three-fourths of the total exposure time and analyzed to determine loss of polymer tensile strength. Said analysis demonstrated a retention of physical strength over a longer period of time for the poly-(butene-1 ) than would have been expected if the poly-(butene-1) and 4-methoxy-3-methylphenyl 3-methylphenyl ketone light sensitizer had been utilized exclusively.

EXAMPLE V

In this example 1.4 grams of 3-isopropylphenyl 3-phenylpropyl ketone, 0.7 grams of 2-hydroxyamyl n-amyl 3-propoxyphenyl amine are added to a plastic comprising 97.9 grams of stabilized poly-(butene-1). The solution is exposed to the accelerated ultra-violet aging fadeometer equipment and irradiated at 35°C. Samples are withdrawn at intervals of one-fourth, one-half and three-fourths of the total exposure time and analyzed to determine loss of physical tensile strength, said analysis demonstrates a retention of physical strength over a longer period of time for the poly(butene-1) than would have been expected if the poly-(butene-1) and 3-isopropylphenyl 3-phenylpropyl ketone light sensitizer had been utilized exclusively.

EXAMPLE VI

In this example three samples were prepared to test the percent tensile strength retained over a duration of time. In sample A polypropylene was utilized without any ketone present to aid in light decomposition. It can be seen from Table I below that the polypropylene retained all its physical strength after 50 minutes and 60 percent after 90 minutes.

TABLE I

| HOURS OF EXPOSURE | (% TENSILE STRENGTH RETAINED) | | |
|---|---|---|---|
| | SAMPLE A | SAMPLE B | SAMPLE C |
| 0 | 100% | 100% | 100% |
| 20 | 100% | 95% | 100% |
| 50 | 100% | 75% | 93% |
| 70 | 90% | 60% | 50% |
| 90 | 60% | 40% | 20% |

SAMPLE A = Polypropylene-no additive
SAMPLE B = Polypropylene containing 0.5% benzophenone
SAMPLE C = Polypropylene containing 1.0% benzophenone and 0.5% N,N'-di-sec octylaminoethanol Sample B comprised the polypropylene with 0.5 percent benzophenone to aid in photodegradation. The benzophenone decreased the tensile strength with the passage of time. In Sample A at 50 minutes the retention was 100 percent in comparison with the 75 percent retention using the benzophenone. In Sample C the potential amount of photodegradation was increased by adding twice the amount of benzophenone, however, the actual photodegradation was slowed to a slower rate than Sample B but at a faster rate than Sample A. The tensile strength of the novel composition of matter was 93 percent in Sample C in comparison to 75 percent in Sample B and 100 percent in Sample A. The reason for this unexpected result resides in the presence of 0.5 weight N,N'-di-sec-octylaminoethanol. The physical properties induced by the alkanol amine to the ketone-containing olefinic polymer demonstrates the desirable photodegradation of the present novel composition of matter.

I claim as my invention:

1. A composition of matter comprising from about 0.01 to about 10.00 weight percent of an arylketone possessing the structure:

in which $R_1$ is selected from a group consisting of an alkyl, aryl, alkaryl, aralkyl, cycloalkyl, substituted alkyl, substituted aryl, substituted alkaryl, substituted aralkyl or substituted cycloalkyl radical and $R_2$ is selected from a group consisting of an alkyl, aryl, alkaryl, aralkyl, cycloalkyl, alkoxy, halogen, carboxy, carboalkoxy, substituted alkyl, substituted aryl, substituted alkaryl, substituted aralkyl, substituted cycloalkyl, substituted alkoxy, substituted carboxy and substituted carboalkoxy radical, and in which n is equal to an integer between 0 and 5; 0.01 to about 10.00 weight percent of an alkanol amine prepared from the reaction of an aliphatic amine or polyamine with one or more equivalents of an olefinic epoxide; and about 80.00 to about 99.98 weight percent of an olefinic polymer selected from the group consisting of polypropylene, polyethylene and polybutene.

2. The composition of matter of claim 1 further characterized in that the aryl ketone is diphenyl ketone, the alkanol amine is N,N'-dioctyl N,N'-di-(2-hydroxyethyl) ethylenediamine, and the olefinic polymer is polypropylene.

3. The composition of matter of claim 1 further characterized in that the aryl ketone is diphenyl ketone, the alkanol amine is N,N'-di-sec-octyl N,N'-di-(2-hydroxyethyl)-ethylenediamine, and the olefinic polymer is polypropylene.

4. The composition of matter of claim 1 further characterized in that the aryl ketone is 4-methoxy-3-methylphenyl 3-methylphenyl ketone, the alkanol amine is n-amyl di-(2-hydroxyethyl) amine, and the olefinic polymer is poly-(butene-1).

5. The composition of matter of claim 1 further characterized in that the aryl ketone is 3-isopropylphenyl 3-phenylpropyl ketone, the alkanol amine is (2-hydroxyamyl)-n-amyl 3-propoxyphenyl amine and the olefinic polymer is poly-(butene-1).

6. The composition of matter of claim 1 further characterized in that the aryl ketone is cyclohexyl 3-cyclopentylphenyl ketone, the alkanol amine is N,N'-di-sec-hexyl N,N'-di-(3-hydroxyheptyl) ethylenediamine and the olefinic epoxide polyethylene.